United States Patent
Onoe et al.

(10) Patent No.: US 7,149,180 B2
(45) Date of Patent: Dec. 12, 2006

(54) APPARATUS FOR RECORDING INFORMATION IN AND/OR REPRODUCING INFORMATION FROM A FERROELECTRIC RECORDING MEDIUM

(75) Inventors: Atsushi Onoe, Saitama (JP); Yasuo Cho, Miyagi (JP)

(73) Assignee: Pioneer Corporation, Tokyo (JP)

( * ) Notice: Subject to any disclaimer, the term of this patent is extended or adjusted under 35 U.S.C. 154(b) by 275 days.

(21) Appl. No.: 10/615,404

(22) Filed: Jul. 9, 2003

(65) Prior Publication Data
US 2004/0047246 A1 Mar. 11, 2004

(30) Foreign Application Priority Data
Jul. 9, 2002 (JP) ............................. 2002-200101

(51) Int. Cl.
*G11B 3/70* (2006.01)
(52) U.S. Cl. .................... 369/276; 369/13.38; 369/126
(58) Field of Classification Search .................. None
See application file for complete search history.

(56) References Cited

U.S. PATENT DOCUMENTS

| | | | | |
|---|---|---|---|---|
| 5,418,029 A * | 5/1995 | Yamamoto et al. | ........ | 428/64.2 |
| 5,481,527 A * | 1/1996 | Kasanuki et al. | ........... | 369/126 |
| 5,646,932 A * | 7/1997 | Kuribayashi et al. | .... | 369/275.3 |
| 5,777,977 A * | 7/1998 | Fujiwara et al. | ............ | 369/126 |
| 5,914,920 A * | 6/1999 | Yokogawa | ............... | 369/275.3 |
| 5,946,284 A * | 8/1999 | Chung et al. | ............... | 369/126 |
| 6,510,130 B1 * | 1/2003 | Hayashi et al. | .......... | 369/275.3 |
| 6,841,220 B1 * | 1/2005 | Onoe et al. | ................ | 428/66.7 |
| 6,912,193 B1 * | 6/2005 | Cho et al. | .................... | 369/126 |
| 6,965,545 B1 * | 11/2005 | Hino et al. | .............. | 369/13.54 |
| 7,065,033 B1 * | 6/2006 | Onoe et al. | ................. | 369/126 |
| 2003/0053400 A1 * | 3/2003 | Cho et al. | .................... | 369/126 |
| 2004/0027935 A1 * | 2/2004 | Cho et al. | .................... | 369/126 |
| 2004/0042351 A1 * | 3/2004 | Onoe et al. | ............. | 369/13.01 |
| 2004/0114913 A1 * | 6/2004 | Kume | ........................ | 386/125 |
| 2004/0263185 A1 * | 12/2004 | Cho et al. | .................... | 324/636 |

* cited by examiner

*Primary Examiner*—Tan Dinh
(74) *Attorney, Agent, or Firm*—Nixon & Vanderhye, PC (57) ABSTRACT

A dielectric recording medium in a disc form is provided with: a center hole; an inner area; a recording area; and an outer area, arranged concentrically from the inside in this order. The inner area, the recording area, and the outer area contain a uniform and flat dielectric material and are polarized with the polarization direction of the recording area opposite to that of the inner area and the outer area in their initial condition. The recording area in which data is recorded has tracks and spaces, each of which is between two of the tracks, and is provided with areas in which control information about the recording/reproducing is recorded, in the track and the space.

1 Claim, 11 Drawing Sheets

APPARATUS FOR RECORDING INFORMATION IN AND/OR REPRODUCING INFORMATION FROM A FERROELECTRIC RECORDING MEDIUM

BACKGROUND OF THE INVENTION

1. Field of the Invention

The present invention relates to a dielectric recording medium and a dielectric recording/reproducing apparatus for recording information with high density in microdomains in a dielectric substance, especially in a ferroelectric substance, and reproducing information recorded in it.

2. Description of the Related Art

As conventional techniques associated with high-density information recording/reproducing, there are proposed optical recording, magnetic recording, thermal recording, ferroelectric recording and the like.

In the optical recording, an optical pickup with a laser as a light source is used. Data is recorded by forming pits that are concave-convex on a disk surface or forming the crystal phase of a phase shift medium. The recorded data is reproduced by using the difference in the reflectance of amorphous phases or using the magneto optical effect. However, the inertia of the pickup is relatively large, which is not appropriate for high-speed reading, and the size of the recording pit in using a focusing optical system, such as lens, is defined by the diffraction limit of light, so that its recording density is limited to 50 G bit/inch$^2$.

In the longitudinal recording of the magnetic recording as represented by a hard disk drive (HDD), its recording density is limited to 100 G bit/inch$^2$ due to thermal fluctuation. Moreover, a magnetic resistance (MR) head has been recently realized using giant magnetic resistance (GMR) and its recording density is expected to be larger than that of the optical disk by using perpendicular magnetic recording. However, the recording density is limited to 1 T bit/inch$^2$ due to thermal fluctuation of magnetic recording information and the presence of a Bloch wall in a code reverse or sign change portion, even if patterned media are used considering the above cause.

As the thermal recording, there are a method in which polymer is used as a recording medium with a microheater formed at a probe tip, a method in which an electron emission source is used with a phase change material used as a recording medium, a method in which near-field light is used with the phase change material used as a recording medium, and the like. However, these methods have the limitations of the recording density, which is between 500 G and 1 T bit/inch$^2$, due to intervening heat conduction.

Moreover, a recording/reproducing technique using a scanning nonlinear dielectric microscopy (SNDM) for the nanoscale analysis of a dielectric (ferroelectric) material has been also proposed by the inventors of the present invention.

However, with respect to dielectric recording/reproducing using the above-described SNDM, specific methods have not been presented for tracking control, address search control, and the like.

SUMMARY OF THE INVENTION

It is therefore an object of the present invention to provide a dielectric recording medium capable of recording/reproducing information, such as control information, with a high Signal to Noise (S/N) ratio so as to enable tracking control and address search, and a dielectric recording/reproducing apparatus, which applies the SNDM technique, for recording/reproducing in the dielectric recording medium.

The above object of the present invention can be achieved by a dielectric recording medium, provided with: a substrate; an electrode disposed on the substrate; and a dielectric material disposed on the electrode. In this dielectric recording medium, polarization directions of the dielectric material are set so as to be aligned in predetermined directions.

According to the dielectric recording medium of the present invention, polarization directions of polarization domains of the dielectric material are set so as to be aligned in predetermined directions in its initial condition. For example, in a recording surface of the dielectric material, a data area for recording information or data is formed, and the polarization directions of the dielectric material within the data area are set so as to be aligned in one direction. The polarization directions of the dielectric material are set before the dielectric material recording medium is actually used for recording data by a user. More concretely, the polarization directions are set in a manufacturing process, an initialize process, before/after an assembling process or the like.

In recording data in the dielectric recording medium, the data is recorded by changing the polarization directions in such a condition that the polarization directions of the dielectric material correspond to the bits of the data (e.g. "1", "0"). If the polarization direction corresponding to one bit condition of data (e.g. "1") is the same as the initial polarization direction, it is not necessary to change the polarization direction to record the bit of data. If the polarization direction corresponding to the other bit condition of data (e.g. "0") is the opposite direction to the initial polarization direction, it is necessary to change the polarization direction to record the bit of data. In the case that the polarization directions of the dielectric material within the data area are initially set in one direction, the polarization directions within all of the data area, except portions where the data is already recorded by changing the polarization direction, maintain the initial uniform polarization direction. Therefore, since there are no disordered polarization directions within the data area, it is possible to read the data recorded in the dielectric material without noise, so that the S/N ratio of a reproduction signal improves. Thus, it is possible to record/reproduce information, such as control information for tracking control and for address search, with a high S/N ratio. Therefore, even in super-high-density recording, it is also possible to perform control, such as tracking control and address search control, with a relatively high accuracy.

In one aspect of the dielectric recording medium of the present invention, the dielectric recording medium is disc-shaped.

According to this aspect, the dielectric recording medium is disc-shaped, with the whole recording surface polarized in predetermined directions in the initial condition. Thus, it is possible to record/reproduce information, such as control information, on the disc-shaped dielectric recording medium with a relatively high S/N ratio.

In another aspect of the dielectric recording medium of the present invention, the dielectric material is divided into an inner area, an outer area and a data area. The inner area and the outer area have predetermined widths respectively. The data area is located between the inner area and the outer area. Polarization directions of the inner area and the outer area are set in the opposite direction to a polarization direction of the data area.

According to this aspect, the disc-shaped dielectric recording medium is divided into the inner area, the data area and the outer area, with the inner area and the outer area initialized to be in the opposite direction to the polarization direction of the data area located between them. Therefore, it is easy to detect the inner and outer positions of the disc-shaped medium. Information associated with recording data, such as a title name, a recording track address, and recording time may be recorded in the inner area or the outer area.

In another aspect of the dielectric recording medium of the present invention, the polarization directions of the dielectric material are set by applying an electric field stronger than the coercive electric field of the dielectric material with a parallel electric field application device.

According to this aspect, the polarization directions of the dielectric material are set in predetermined directions with the apparatus for applying a parallel electric field stronger than the coercive electric field of the dielectric material. Moreover, in the disc-shaped medium having the inner area, the outer area and the data area, an electrode having the same shape as that of the inner area and an electrode having the same shape as that of the outer area are prepared, and the parallel electric field is applied by using these electrodes. For example, after the whole surface of the dielectric material is polarized in one direction, an electric field in the opposite direction is applied with the data area left, so that the inner and outer areas can be areas polarized in the opposite direction to that of the data area.

In another aspect of the dielectric recording medium of the present invention, the dielectric recording medium is provided with linear tracks for recording data thereon.

According to this aspect, the dielectric recording medium is rectangular or tape-shaped, in which the linear tracks are provided in advance. When recording, writing is performed on these tracks. Thus, it is possible to record/reproduce, with a relatively high S/N ratio, information such as control information on the dielectric recording medium of a rectangle, a tape shape, or the like.

In another aspect of the dielectric recording medium of the present invention, the dielectric recording medium is provided with concentric or spiral tracks for recording data thereon.

According to this aspect, the dielectric recording medium is disc-shaped, in which the concentric tracks including spiral ones are provided in advance. When recording, writing is performed on these tracks. Thus, it is possible to record/reproduce, with a relatively high S/N ratio, information such as control information on the dielectric recording medium of a disc shape.

In another aspect of the dielectric recording medium of the present invention, there is provided a space having a predetermined width between two of the tracks.

According to this aspect, it is possible to obtain a tracking error signal for a predetermined tracking control method, with a relatively high S/N ratio.

In another aspect of the dielectric recording medium of the present invention, the dielectric material is provided with two dielectric material layers. One is located on a first side of the substrate. The other is located on a second side of the substrate located opposite the first side.

According to this aspect, the dielectric recording medium becomes a larger-capacity recording medium because of the recording layers provided on its both sides. The both recording surfaces are polarized in predetermined directions, but their polarization directions may be different. It may be provided with the inner area and the outer area.

In another aspect of the dielectric recording medium of the present invention, the dielectric material is a ferroelectric material.

According to this aspect, the ferroelectric material may be used as a medium material.

In another aspect of the dielectric recording medium of the present invention, the ferroelectric material is $LiTaO_3$.

According to this aspect, $LiTaO_3$ may be used as a medium material, in which it is easy to reverse the polarization even by applying an electric field with a probe because of its low dielectric constant. It may be easily formed to be the dielectric recording medium by a predetermined method so that the recording is performed with respect to the Z surface of the $LiTaO_3$, where a plus surface and a minus surface of the polarization are in a 180-degree domain relationship.

In another aspect of the dielectric recording medium of the present invention, the dielectric recording medium is provided with a control information area for recording control information for controlling a data recording process or a data reproducing process in relation to the dielectric recording medium, the control information area being located at a predetermined position of any one of the track.

According to this aspect, it is possible to perform recording/reproducing control, such as tracking control and address search control, on the basis of the control information recorded in the control information area in the track.

In another aspect of the dielectric recording medium of the present invention, the control information is information about tracking.

According to this aspect, the tracking control of the recording/reproducing head for the track can be performed on the basis of this information.

In another aspect of the dielectric recording medium of the present invention, the control information is information about track address.

According to this aspect, the address control of the recording/reproducing head for the track can be performed on the basis of this information.

In another aspect of the dielectric recording medium of the present invention, the control information is information about a relative movement rate between the dielectric recording medium and a recording/reproducing head.

According to this aspect, the control of the relative movement rate of the recording/reproducing head for the track can be performed on the basis of this information.

The above object of the present invention can be achieved by a dielectric recording/reproducing apparatus for performing a data recording process of recording information or data in a dielectric recording medium or a data reproducing process of reproducing information or data recorded in the dielectric recording medium. The dielectric recording medium is provided with: a substrate; an electrode disposed on the substrate; a dielectric material disposed on the electrode having polarization domains set so as to be aligned in a predetermined direction; tracks for recording data thereon; and a control information area for recording control information for controlling a data recording process or a data reproducing process in relation to the dielectric recording medium. The control information area is located at a predetermined position of any one of the track. The dielectric recording/reproducing apparatus is provided with: a recording/reproducing head for recording or reproducing the data on the tracks; a control information detection device for detecting the control information recorded in the control information area on the basis of an output signal of the recording/reproducing head; and a control device for controlling the data recording process or the data reproducing process on the basis of a detection result of the control information detection device.

According to the dielectric recording/reproducing apparatus of the present invention, the recording/reproducing head records data on the track or reproduces the recorded data from the track. The control information is detected from the reproduced signal, and the data recording process or the data reproducing process is controlled on the basis of the control information. Thus, it is possible to perform various control, such as tracking control and address search control, with a relatively high accuracy, on the basis of the control information which can be recorded/reproduced with a relatively high S/N ratio.

In one aspect of the dielectric recording/reproducing apparatus of the present invention, the control information detected by the control information detection device is track address information, and the control device is a device for controlling address search and performs address search control of the recording/reproducing head on the basis of the track address information.

According to this aspect, the recording/reproducing head is moved on the basis of the reproduced track address information and is controlled with respect to the movement to an indicated track.

In another aspect of the dielectric recording/reproducing apparatus of the present invention, the control information detected by the control information detection device is information about a relative movement rate between the dielectric recording medium and the recording/reproducing head, and the control device is a device for controlling the relative movement rate and performs relative movement rate control between the dielectric recording medium and the recording/reproducing head on the basis of the information about the rel7ative movement rate.

According to this aspect, the recording/reproducing head or the dielectric recording medium is moved on the basis of the reproduced information about the relative movement rate associated with the dielectric recording/reproducing head and the dielectric recording medium and is controlled so that the relative rate is a predetermined rate.

In another aspect of the dielectric recording/reproducing apparatus of the present invention, tracking control is performed on the basis of the amplitude image level of a reproduction signal outputted from the recording/reproducing head.

According to this aspect, out of the phase image and the amplitude image corresponding to the polarization state of a dielectric substance, the signal of the amplitude image, which changes relatively moderately, is used for the tracking control.

In another aspect of the dielectric recording/reproducing apparatus of the present invention, the tracking control is performed by wobbling.

According to this aspect, even if information about tracking control is not recorded as the control information, the tracking control may be performed from a wobbling direction of wobbling the recording/reproducing head in the direction perpendicular to the recording tracks and from the increase/decrease of a reproduction signal by the wobbling.

In another aspect of the dielectric recording/reproducing apparatus of the present invention, tracking control is performed on the basis of the phase of a recording pit included in a tracking pit signal in a reproduction signal outputted from the recording/reproducing head. The pit used here is not a concave-convex hole, but a recording mark electrically polarized into positive or negative.

According to this aspect, with respect to the dielectric recording medium having tracking pits for tracking control on the recording tracks as the control information, the tracking control is performed on the basis of the phase of the pit signals of the adjacent tracks included in a reproduction signal of the tracking pit. Assuming that the pits recorded in the adjacent tracks and now being traced are recorded with them shifted only at a predetermined angle (e.g. 180 degrees) in the phase relationship. In this case, if the recording/reproducing head is off the target track, the pit signal included in the reproduction signal contains the pit signal obtained form the adjacent track, so that the pit signal obtained from the target track and the pit signal obtained from the adjacent track are mixed in the reproduction signal. Therefore, it is possible to recognize the fact that the head is off the target track and the direction of the deviation of the head by checking the phase of the pit signals included in the reproduction signal.

In another aspect of the dielectric recording/reproducing apparatus of the present invention, the recording/reproducing head is a head for recording/reproducing information in/from the dielectric material on the basis of a scanning nonlinear dielectric microscopy method.

According to this aspect, the SNDM technique is applied, especially to reproducing. The SNDM reproduction technique is introduced in detail by the present inventor, Yasuo Cho, in Oyo Butsuri Vol. 67, No. 3, p327 (1998). Alternatively, it is also described in detail in Japanese Patent Application No. 2001-274346 and No. 2001-274347, etc., filed by the present inventors. In this technique, a probe scans over a dielectric (ferroelectric) substance to detect the capacitance corresponding to the nonlinear dielectric constant of the dielectric (ferroelectric) substance. The data or information is recorded as the polarization directions of the dielectric (ferroelectric) substance. The nonlinear dielectric constant of the dielectric (ferroelectric) substance is changed according to the polarization direction. Therefore, by detecting the capacitance corresponding to the nonlinear dielectric constant of the dielectric (ferroelectric) substance, the data or information recorded in the dielectric (ferroelectric) substance can be read. On the other hand, the data is recorded by applying an electric field to the dielectric (ferroelectric) substance from the probe, or from the lower electrode formed in the dielectric (ferroelectric) substance and thus making the polarization to be in a predetermined direction. Extremely high-density recording becomes possible. Incidentally, the probe is not limited to single use, such as the one for recording or the one for reproducing, but may be sharable as the one for recording and reproducing.

Incidentally, with respect to the shape of the electrode for applying an electric field, a pin shape or needle-shape, a cantilever-shape, and the like are known as specific structures. The electrode having these shapes is collectively referred to as the "probe" in the present application as occasion demands.

In another aspect of the dielectric recording/reproducing apparatus of the present invention, the recording/reproducing head is provided with a plurality of recording/reproducing electrodes, each of which corresponding to the respective one of a plurality of recording tracks.

According to this aspect, it is possible to simultaneously perform recording/reproducing operation to the plurality of recording tracks, which increases a recording/reproducing rate.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (Embodiment of Dielectric Recording Medium)

Figure 1A:
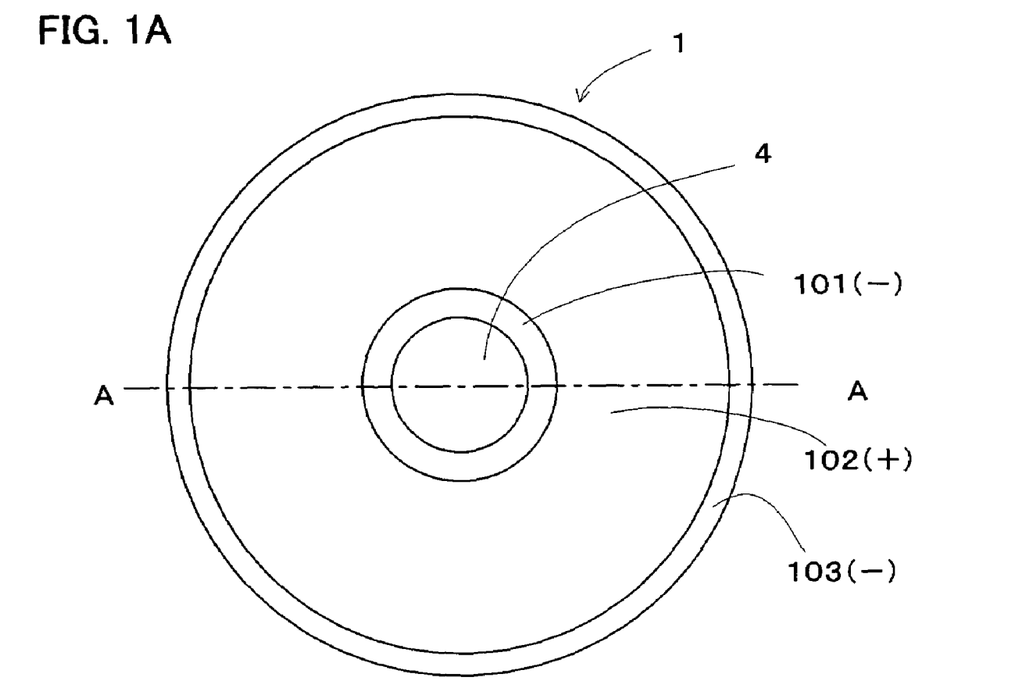
FIG. 1A is a plan view showing one example of a dielectric recording medium associated with the present invention.

The embodiment of a dielectric recording medium associated with the present invention will be explained. As shown in FIG. 1A, a ferroelectric recording medium 1 is one example of a dielectric recording medium. The ferroelectric recording medium 1 is in the shape of a disc. The ferroelectric recording medium 1 is provided with: a center hole 4; an inner area 101; a recording area 102; and an outer area 103, arranged concentrically from the inside in this order. The center hole 4 is used when attaching the ferroelectric recording medium 1 to a spindle motor or the like.

The inner area 101, the recording area 102 and the outer area 103 are formed in a surface of or a layer in the ferroelectric recording medium 1 made of a uniform and flat ferroelectric material. The recording area 102 has an up polarization direction, i.e. being a plus surface. In this case, the inner area 101 and the outer area 103 have down polarization direction, i.e. being a minus surface. Alternatively, the polarization directions may be set in such a condition that the recording area 102 has an up polarization direction, and the inner area 101 and the outer area 103 have down polarization direction.

The recording area 102 is an area for recording data. The recording area 102 has tracks and spaces, each of which is between two of the tracks. In the recording area 102, areas for recording control information that is used for controlling the recording and reproducing are formed on several or many parts of tracks and spaces. The inner area 101 and the outer area 103 are used to recognize the inner and outer positions of the ferroelectric recording medium 1 and can be also used as an area in which information about recording data, such as titles, addresses, recording times, and recording capacities, are recorded.

Figure 1B:
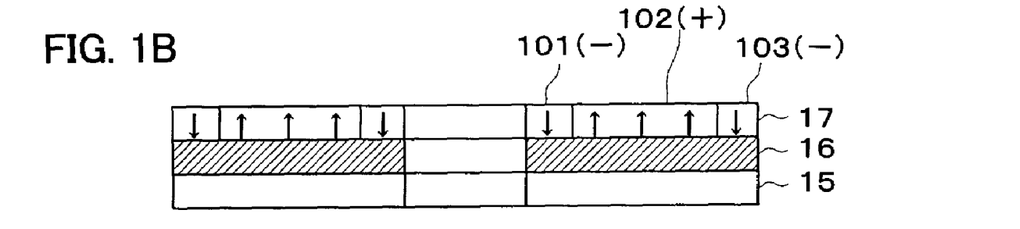
FIG. 1B is an A—A cross sectional view of FIG. 1A.

As shown in FIG. 1B, the ferroelectric recording medium 1 is provided with: a substrate 15; an electrode 16 laminated on the substrate 15; and a ferroelectric material 17 laminated on the electrode 16. The inner area 101, the recording area 102, and the outer area 103 are independently polarized in the directions shown with arrows.

The substrate 15 may be Si, for example, which is a preferable material due to its strength, chemical stability, workability and the like. The electrode 16 is intended to generate an electric field between the electrode 16 and the probe of a recording/reproducing head and applies to the ferroelectric material 17 an electric field stronger than the coercive electric field of the ferroelectric material 17 to determine the polarization direction. Data is recorded by determining the polarization direction correspondingly to the data. Incidentally, the probe is an electrode, which is provided for the recording/reproducing head, for applying an electric field to the ferroelectric material 17, and a pin shape or needle-shape, a cantilever-shape and the like are known as its specific structures.

As the ferroelectric material 17, a ferroelectric substance, such as $LiTaO_3$, may be used. The recording is performed with respect to the Z surface of the $LiTaO_3$, where a plus surface and a minus surface of the polarization are in a 180-degree domain relationship. Alternatively, other ferroelectric materials may be used.

Alternatively, the ferroelectric recording medium of the present invention may have only the recording area 102. It is also possible to divide the recording area 102 of the ferroelectric recording medium 1 into a plurality of concentric areas and provide separation zones between these areas. Each of the separation zones has the same polarization direction as that in the inner area 101 and the outer area 103. Namely, the polarization direction of each separation zone is set so as to be in the opposite direction to that of the recording area.

Incidentally, the ferroelectric recording medium associated with the present invention is not limited to the above-described disc formed one, but may be available to a rectangular one having linear tracks. Also, in this rectangular-shaped medium, a ferroelectric material may be initialized to be in a polarization state having one direction, and an area with a predetermined width polarized in the opposite direction to that of the recording area may be provided at the peripheral portion of the rectangular medium. Moreover, in the rectangular-shaped medium, it is also possible to divide the recording area into a plurality of domains. In this type of medium, separation areas are formed between neighboring domains. The polarization direction of each separation area is set in the opposite direction to that of the divided recording area. The ferroelectric recording medium of this kind is preferably used for recording/reproducing with a plurality of probes, which is performed by the relative linear movement of the ferroelectric recording medium and the probes.

Next, an example of the tracks provided in the recording area 102 of the ferroelectric recording medium 1 described above will be explained with reference to FIG. 2. Tracks 5 and spaces 6 are alternately placed concentrically or spirally, each track having a control information area 7 and a data area 8. The control information area 7 may be formed in the space 6. In the initial state, the polarization direction in the tracks 5 and spaces 6 is set in the positive direction. The polarization in the positive direction is related to data "1" and polarization in the negative direction is related to data "0" with respect to record information. In this case, if the data "0" is recorded on the tracks 5 or spaces 6, an electric field in the negative direction stronger than the coercive electric field is applied to reverse the polarization direction. On the other hand, when the data "1" is recorded on the track 5 and spaces 6, the application of the electric field is not needed because the initial polarization direction means the data "1". Alternatively, the polarization directions for the data "1" and the data "0" may be reversed each other.

Figure 2:
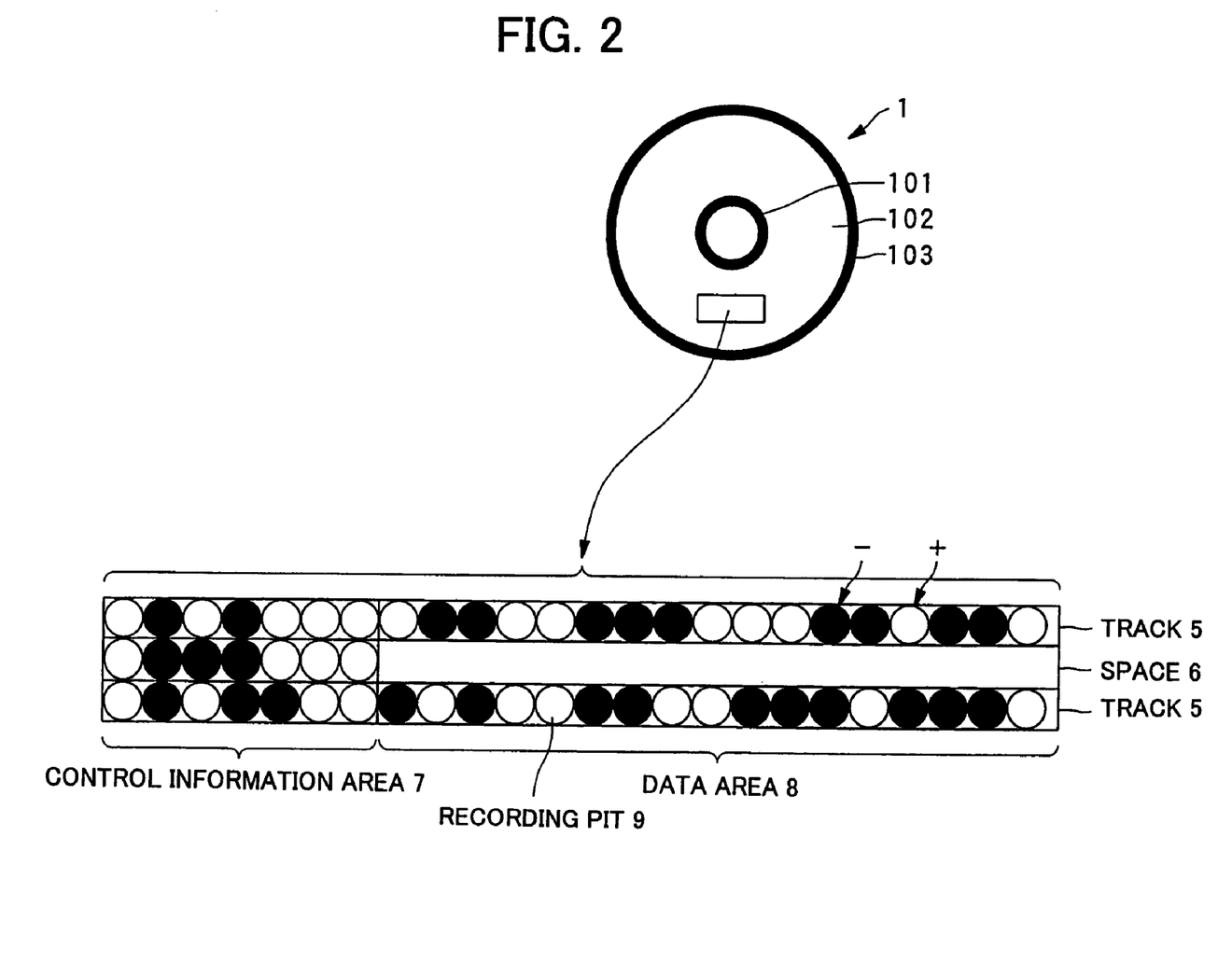
FIG. 2 is a schematic diagram showing a track structure example of the dielectric recording medium associated with the present invention.

In the control information area 7, there are recorded information about tracking, information about track access, information about a relative movement rate between the probe and the ferroelectric recording medium 1, and the like. It is also possible to provide a plurality of control information areas 7 on the same circle.

Figure 3:
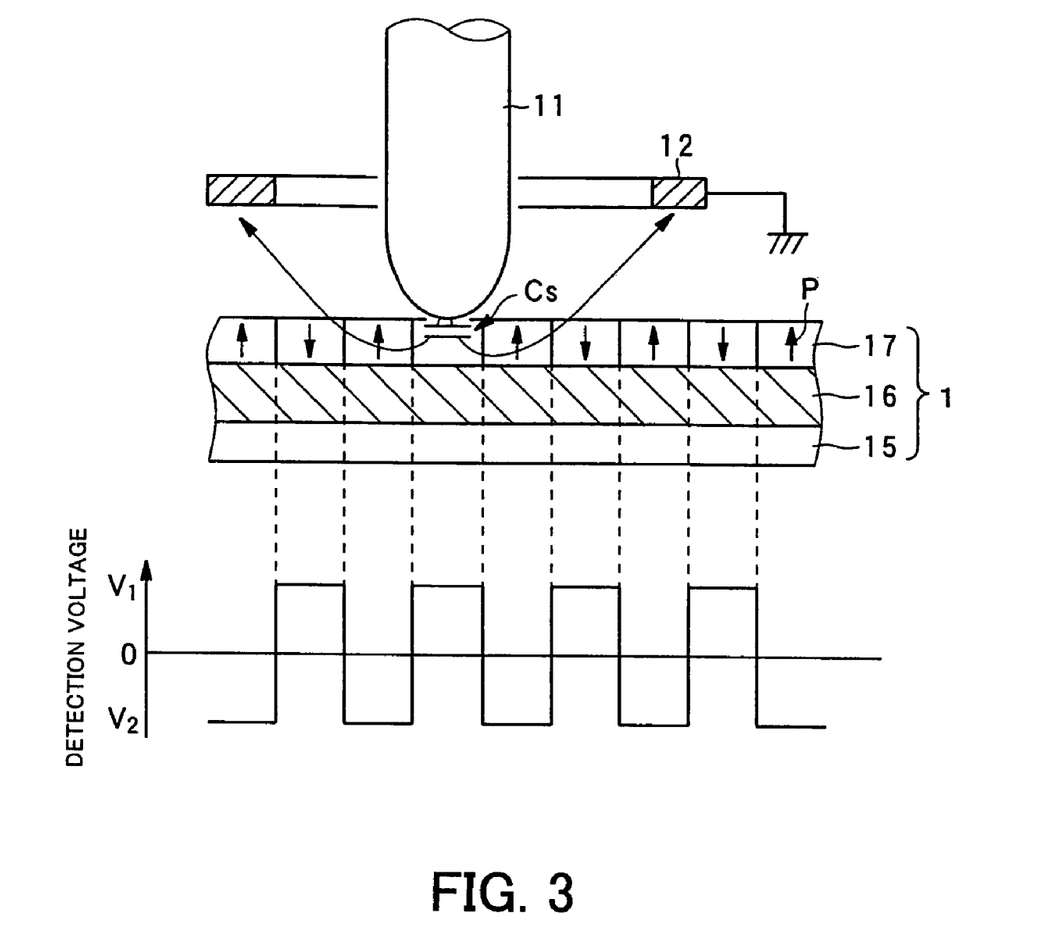
FIG. 3 is a schematic diagram to explain information recording/ reproducing with respect to a dielectric substance.

Next, the recording/reproducing principle of the above-described ferroelectric recording medium 1 will be explained with reference to FIG. 3. A ferroelectric recording medium 1 is provided with: the substrate 15; the electrode 16 placed on the substrate 15; and the ferroelectric material 17 placed on the electrode 16. After the data is recorded in the ferroelectric recording medium, the polarization directions P of the ferroelectric material 17 correspond to recorded data (e.g. bit conditions of the recorded data). As the ferroelectric material 17, a ferroelectric substance, such as $LiTaO_3$, may be used, and is placed so that the recording is performed with respect to the Z surface of the $LiTaO_3$, where a plus surface and a minus surface of the polarization are in a 180-degree domain relationship.

In order to record data in the ferroelectric recording medium 1, an electric field stronger than the coercive electric field of the ferroelectric material 17 is applied between a probe 11 and the electrode 16. By applying the electric field, the ferroelectric material 17 is polarized in a direction corresponding to the direction of the applied electric field. The application of the electric field corresponds to the data to be recorded, so that the polarization direction corresponds to data. A return electrode 12 is an electrode for returning a high-frequency electric field applied to the ferroelectric material 17 from the probe 11 so as to reproduce recorded data and is placed so as to surround the probe 11. Incidentally, the return electrode 12 may be in any form if shaped and placed to allow the return of the electric field from the probe 11 without resistance.

Figure 4A:
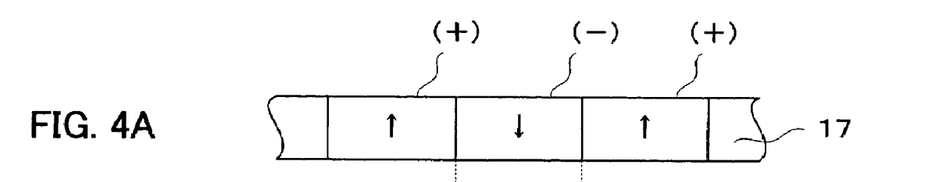
FIG. 4A to FIG. 4C are schematic diagrams, FIG. 4A showing the polarization direction of the dielectric substance, FIG. 4B showing a phase image, and FIG. 4C showing an amplitude image.
Figure 4B:
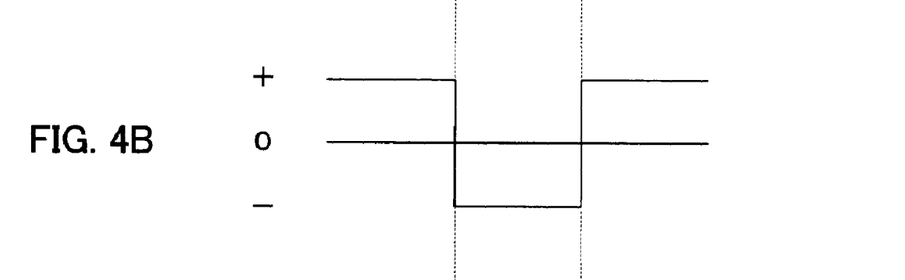
Figure 4C:
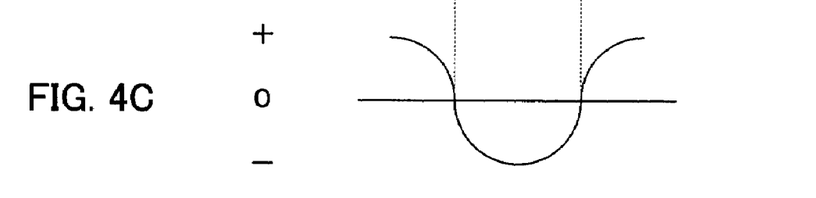

FIG. 4A to FIG. 4C are schematic diagrams, FIG. 4A showing the polarization direction of the ferroelectric substance, FIG. 4B showing a phase image, and FIG. 4C showing an amplitude image. The phase image shows the signal component of phase information in a reproduction signal reproduced by the SNDM. This corresponds to the plus and minus of the polarization direction corresponding to recorded data. The amplitude image shows a signal including not only a phase component but also an intensity component in the reproduction signal reproduced by the SNDM, and the latter is closer to the raw data of the reproduction signal. The phase image has an extremely steep slope because it is a signal corresponding to the plus and minus of the polarization, and this tendency is significant especially when the plus surface and the minus surface of the polarization are in a 180-degree domain relationship. On the other hand, the amplitude image has a relatively gentle slope. This is because, although the polarity of the reproduction signal corresponds to the polarization direction, the reproduction signal is not generated only based on a polarization direction at one point just under the probe but on polarization directions within a limited small area around the probe (However, this area is very small.). For example, when reproducing while the probe is passing through an interface between the adjacent plus and minus polarization domains, the signal intensity is sequentially changed from plus to minus because the sum of amplitude components of the signal is obtained from the both domains. This signal of the amplitude image is used for tracking control.

Figure 5:
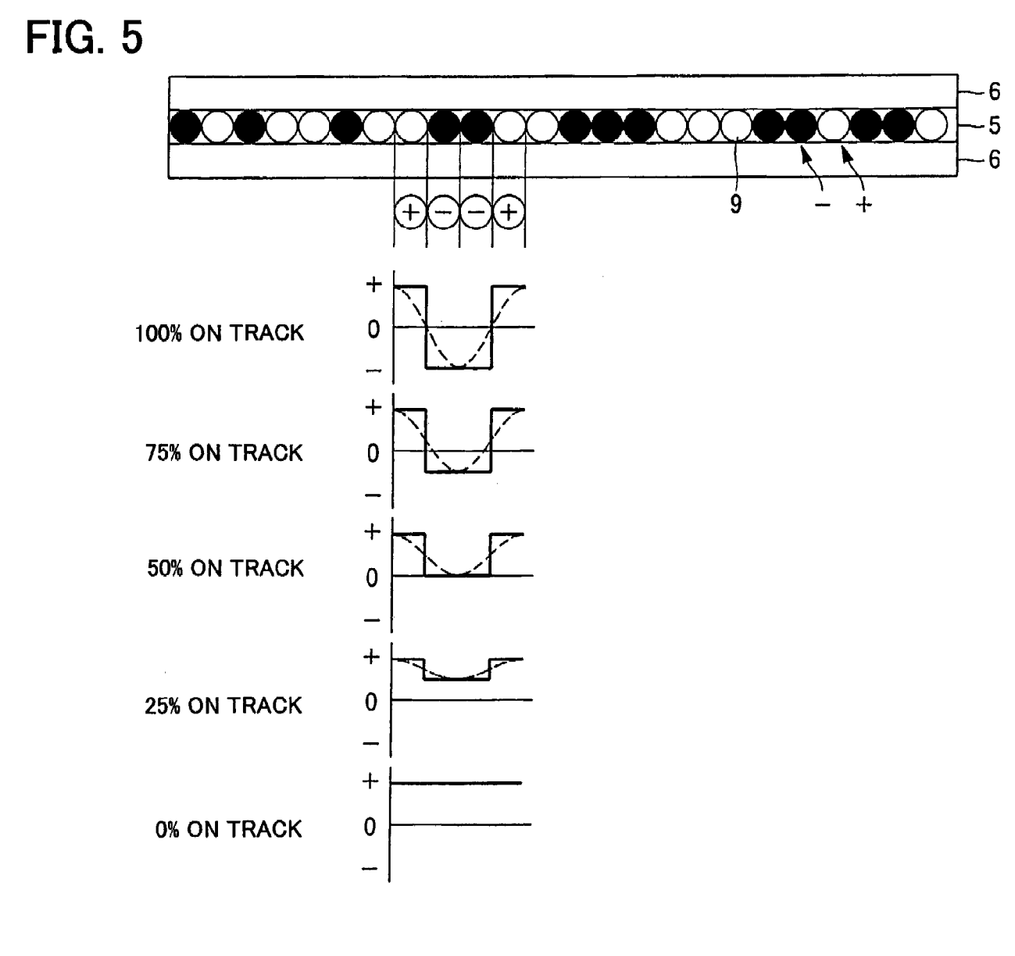
FIG. 5 is a schematic diagram showing the phase image and the amplitude image of the dielectric recording medium depending on the tracking state of a recording/reproducing head associated with the present invention.

FIG. 5 is a schematic diagram showing the phase image and the amplitude image depending on the tracking state of the recording/reproducing head, in which the spaces 6 are provided on the both side of the track 5, sandwiching it. The spaces 6 are polarized in the positive direction, and the track 5 has pits 9 polarized in the positive direction correspondingly to data and pits 9 polarized in the negative direction. The graphs show the phase image and the amplitude image in a portion with data arranged in the order of plus, minus, minus and plus. Although the respective five graphs show the phase image and the amplitude image in the same portion, "ON track" state is different in each graph. "On track" state means a state in which the probe follows the track without being off the track or out of position. When the positional relationship between the probe and the track maintains exactly, "On track" state is 100%. In five graphs in FIG. 5, the "ON track" state of the probe 11 is 100%, 75%, 50%, 25% and 0% from the top. The solid line shows the phase image, and the dotted line shows the amplitude image.

In the case that "ON track" state is 100%, the amplitude corresponding to the plus pit and the amplitude corresponding to the minus pit appear equally in the vertical direction. Namely, these amplitude become symmetry with respect to the zero level. When such a signal is obtained, the probe 11 is determined to be right on the track 5. As the probe 11 is in "OFF track" state that means a state in which the probe is off the track or out of position, the influence of the plus polarization domains in the spaces 6 increases, thereby reducing the difference in amplitude level and thus increasing the total amplitude level. From this state, it is detected that the tracking is out of position, and tracking servo is performed so that the probe 11 traces on the track 5.

Here, the output (the amplitudes of the obtained signal) is the same as that shown in FIG. 5 despite of the deviation direction of the probe 11, so that if nothing is done, it is not possible to determine in which direction the probe 11 deviates. In order to solve it, it is possible to apply wobbling technique, for example, which is commonly used for an optical disk. Namely, the tracking servo can be performed by slightly vibrating the probe 11 on the track 5 in the radial direction of the disk and determining the deviation direction of the probe 11 from the vibration direction and the output at that time.

Figure 6A:
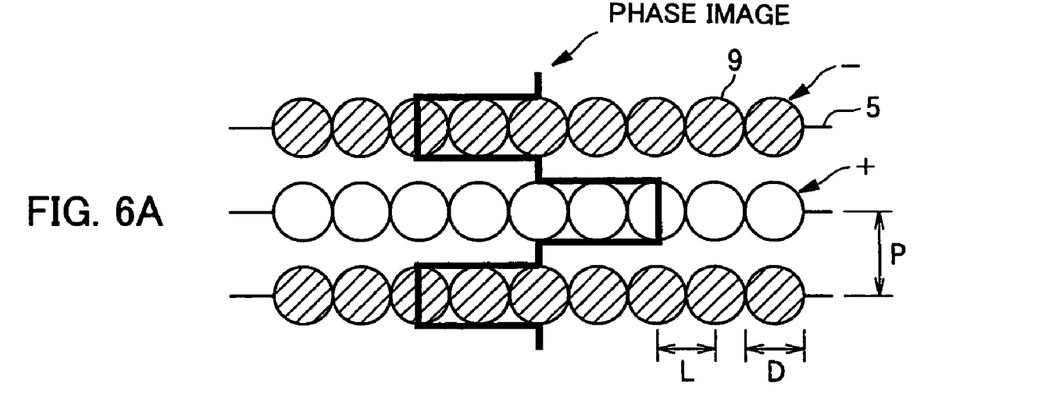
FIG. 6A to FIG. 6C are schematic diagrams showing examples of the relationship between the recording track and the pit of the dielectric recording medium associated with the present invention.
Figure 6B:
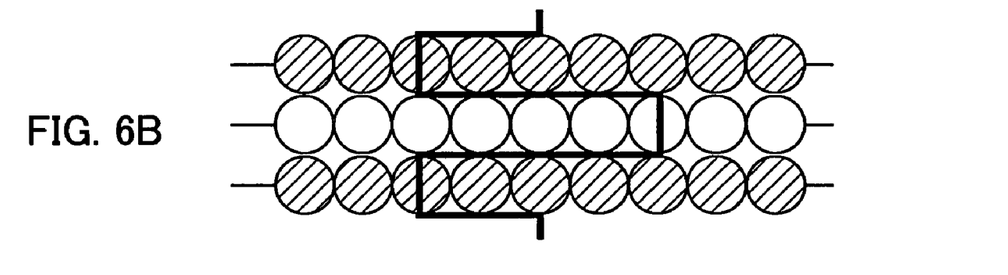
Figure 6C:
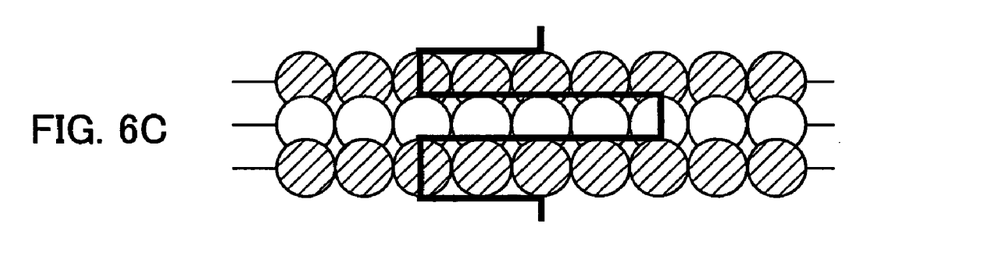

FIG. 6A to FIG. 6C are schematic diagrams showing examples of the relationship between the recording track 5 and the pit 9 of the ferroelectric recording medium 1, FIG. 6A showing that a pit size D is equal to a pit interval L with a track pitch P larger than the pit size D, FIG. 6B showing that the pit size D, the pit interval L, and the track pitch P have the same size, and FIG. 6C showing that the pit size D is equal to the pit interval L with the track pitch P smaller than the pit size D. In the SNDM method, there is little crosstalk, except on the interface of the recording pits with different bit conditions, because the reproduction resolution of the recording mark is extremely high, so that even if recording them with overlap as shown in FIG. 5C, it is possible to reproduce them in high quality, thereby increasing the recording density.

Next, the structure of the head for recording in/reproducing from the above-described ferroelectric recording medium 1 will be explained with reference to FIG. 7 and FIG. 8.

Figure 7:
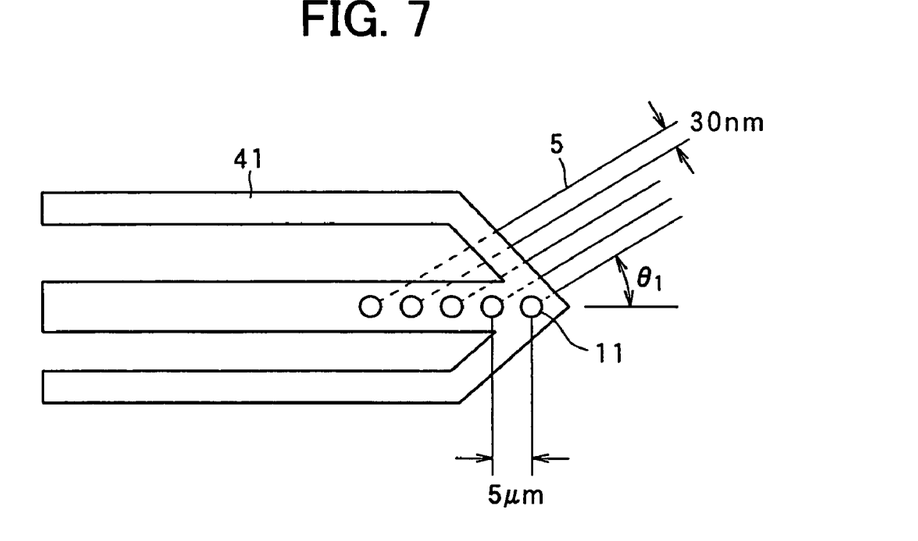
FIG. 7 is a schematic diagram showing a first example of the head used for recording/reproducing in the dielectric recording medium associated with the present invention.

As shown in FIG. 7, a head 41 has five probes 11 in a line on its one end. The interval between two probes is 5 μm, for example, and each probe 11 corresponds to the respective one of the tracks 5. Namely, the line of the plurality of probes 11 is placed at an angle of θ1 to the track 5. If the track pitch is 30 nm, for example, $\theta 1 = \sin^{-1}[30/(5 \times 10^3)]$ =0.34 degrees. The number of the probes is not limited to the above number.

Figure 8:
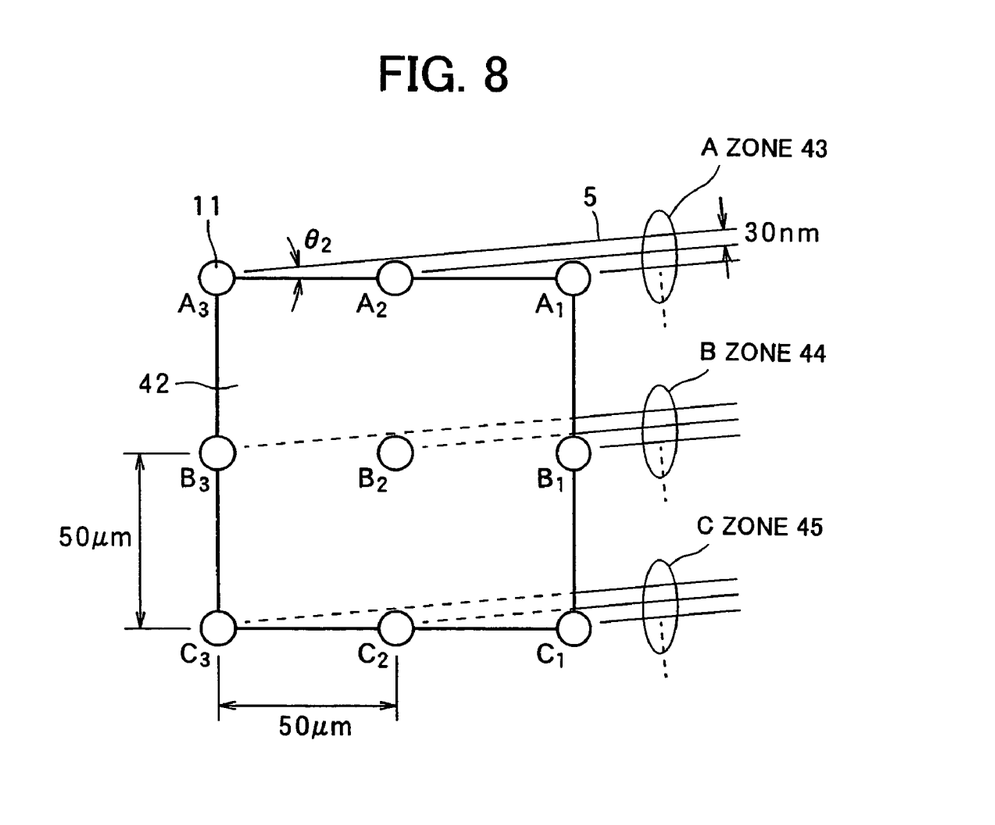
FIG. 8 is a schematic diagram showing a second example of the head used for recording/reproducing in the dielectric recording medium associated with the present invention.

As shown in FIG. 8, a head 42 has three in a row, three in a column, and in total nine probes 11. Probes A1 to A3, probes B1 to B3, and probes C1 to C3 are related to an A zone, a B zone, and a C zone in a recording area 102, respectively, and are placed at an angle of θ2 to the track 5. Assuming that the track pitch is 30 nm and the interval of the two probes is 50 μm, for example, $\theta 2 = \sin^{-1}[30/(50 \times 10^3)]$ =0.34 degrees. The number of the probes is not limited to the above number. N×M probes may be disposed on the head.

Using the above-described head provided with a plurality of probes, it is possible to record/reproduce data at a high transfer rate.

Figure 9:
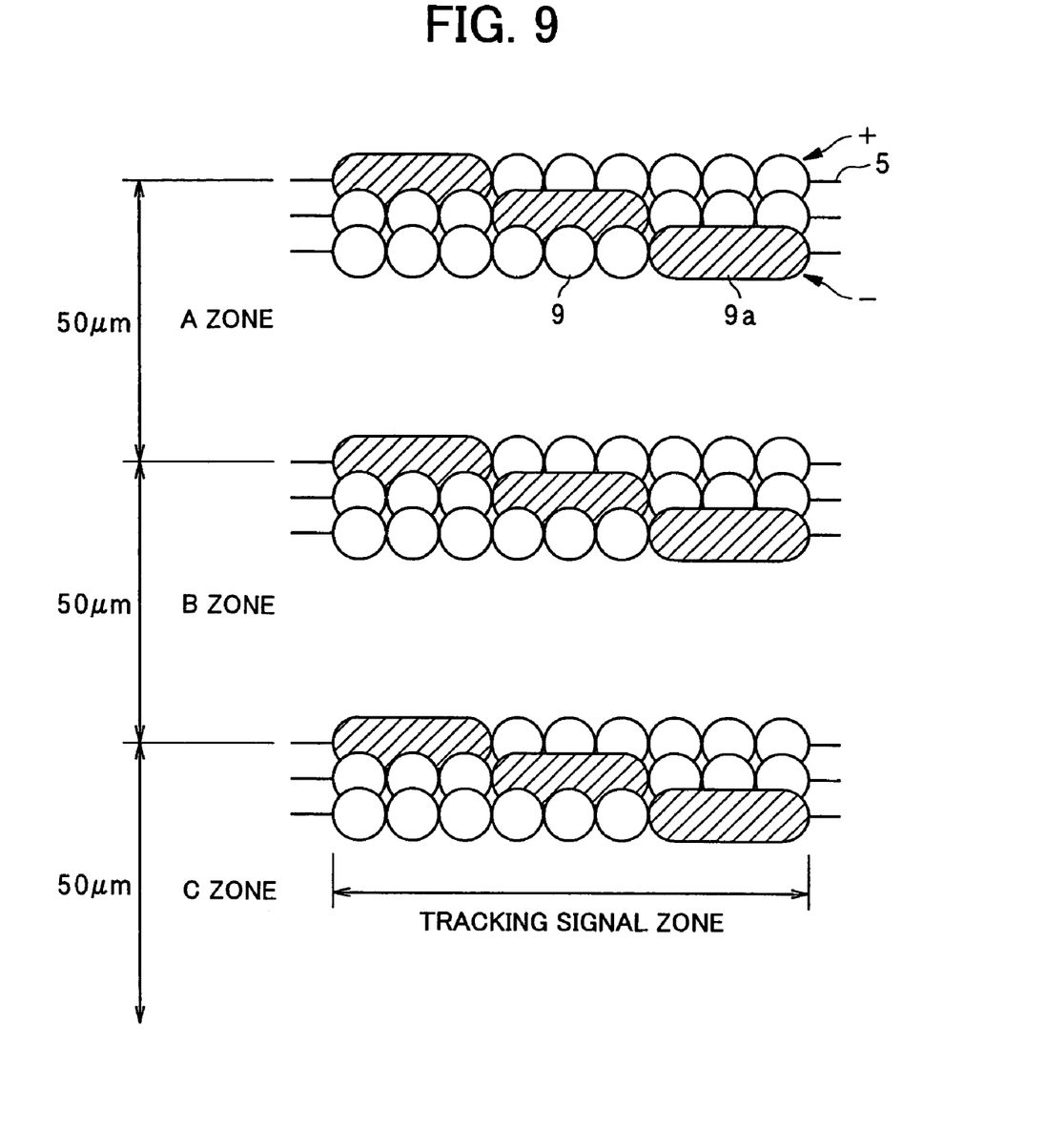
FIG. 9 is a schematic diagram showing a recording format of the tracking signal zone of the dielectric recording medium associated with the present invention.

FIG. 9 is a schematic diagram showing the structure of the tracks 5 to which the head 42 in FIG. 8 is applied and which is provided with a plurality of zones at intervals of 50 μm. Each zone is provided with substantially 1700 tracks at intervals of 30 μm. Using the head 42, it is possible to simultaneously record/reproduce data on each track in each zone, increasing a recording/reproducing rate. FIG. 9 shows an example having tracking signal zones, in which pits 9a for tracking are provided at predetermined positions in the tracks 5 in order to perform a tracking control. Incidentally, the pit structure of the tracking signal zone is not limited to this, and various aspects including other control signals are also conceivable.

Figure 10A:
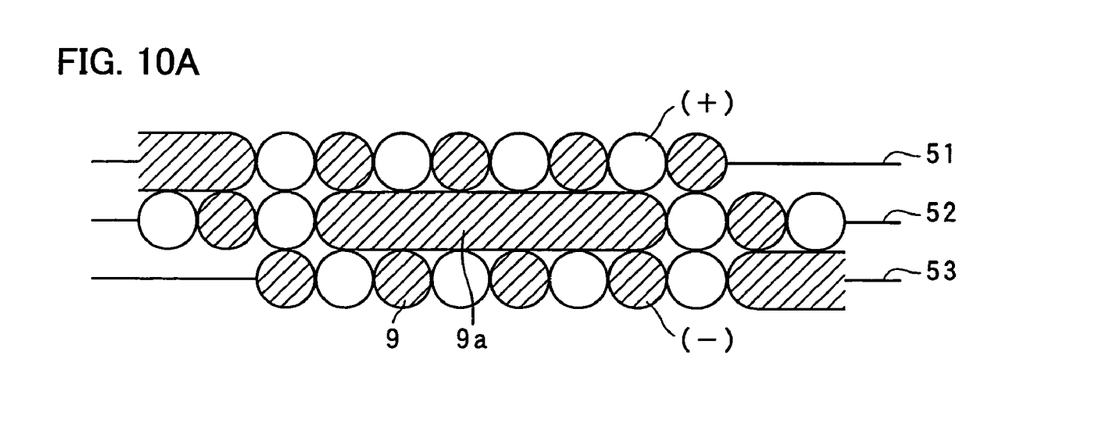
FIG. 10A and FIG. 10B are schematic diagrams showing one example of the format of the tracking signal zone, FIG. 10A showing the pit placement of the tracking signal zone, and FIG. 10B(A) to FIG. 10B(E) showing waveforms.
Figure 10B:
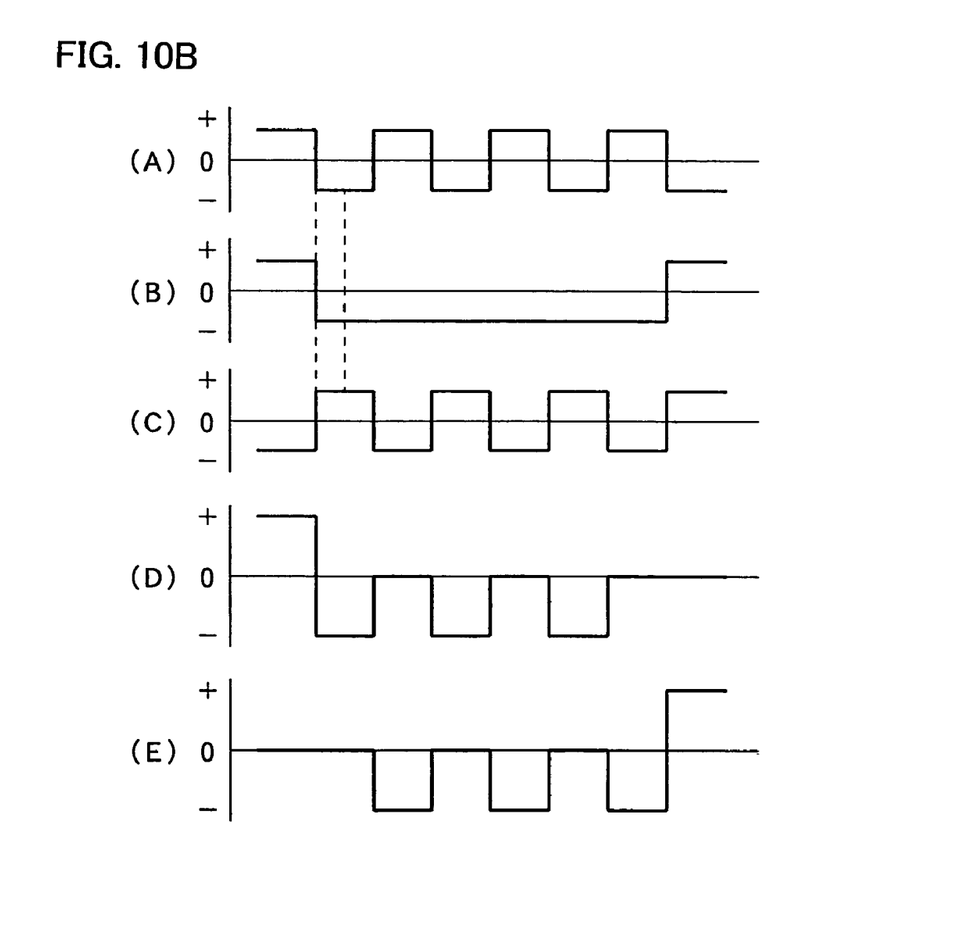

FIG. 10A to FIG. 10B(E) are schematic diagrams showing one example of the format of the tracking signal zone in FIG. 9, FIG. 10A showing the pit placement of the tracking signal zone, and FIG. 10B(A) to FIG. 10B(E) showing waveforms.

As shown in FIG. 10A, the pit 9a for tracking in a track 52 is polarized in the negative direction, for example. In the track 52, the pit 9a is sandwiched between the pits 9 polarized in the positive direction. With respect to the pits 9 in a track 51 and a track 53 sandwiching the track 52, which correspond to the pit 9a for tracking in the track 52, the pits 9 polarized in the positive direction and the pits 9 polarized in the negative direction are alternately placed. Each track 5 has the same configuration.

FIG. 10B(A) shows a signal pattern of the track 51, FIG. 10B(B) showing a signal pattern of the track 52, and FIG. 10B(C) showing a signal pattern of the track 53. These patterns are presented in signals reproduced when "ON track" state is 100%, namely, the probe 11 exactly traces on the track. A signal obtained when the probe 11 traces in the middle of the track 51 and the track 52 is shown in FIG. 10B(D), and a signal obtained when the probe 11 traces in the middle of the track 52 and the track 53 is shown in FIG. 10B(E). Namely, it is possible to determine near which track the probe 11 is tracing, from the phase of a signal component which is included in the reproducing signal and which is obtained from the adjacent tracks. It is possible to control the tracking of the probe 11 on the basis of tracking error detected by this method and the amount of the tracking error explained with reference to FIG. 5.

(Embodiment of Dielectric Recording/Reproducing Apparatus)

Figure 11:
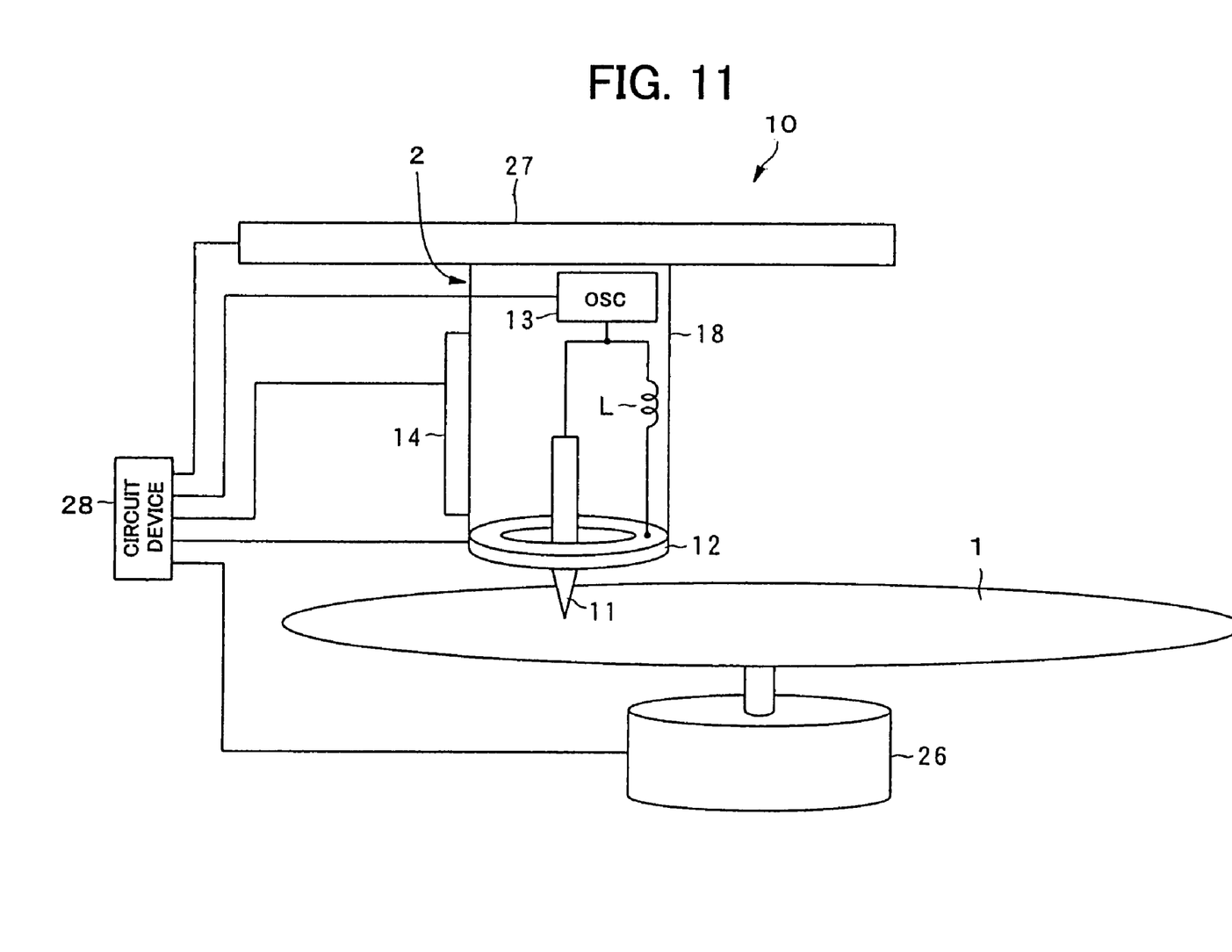
FIG. 11 is a schematic diagram showing an embodiment of a dielectric recording/reproducing apparatus using the dielectric recording medium associated with the present invention.
Figure 12:
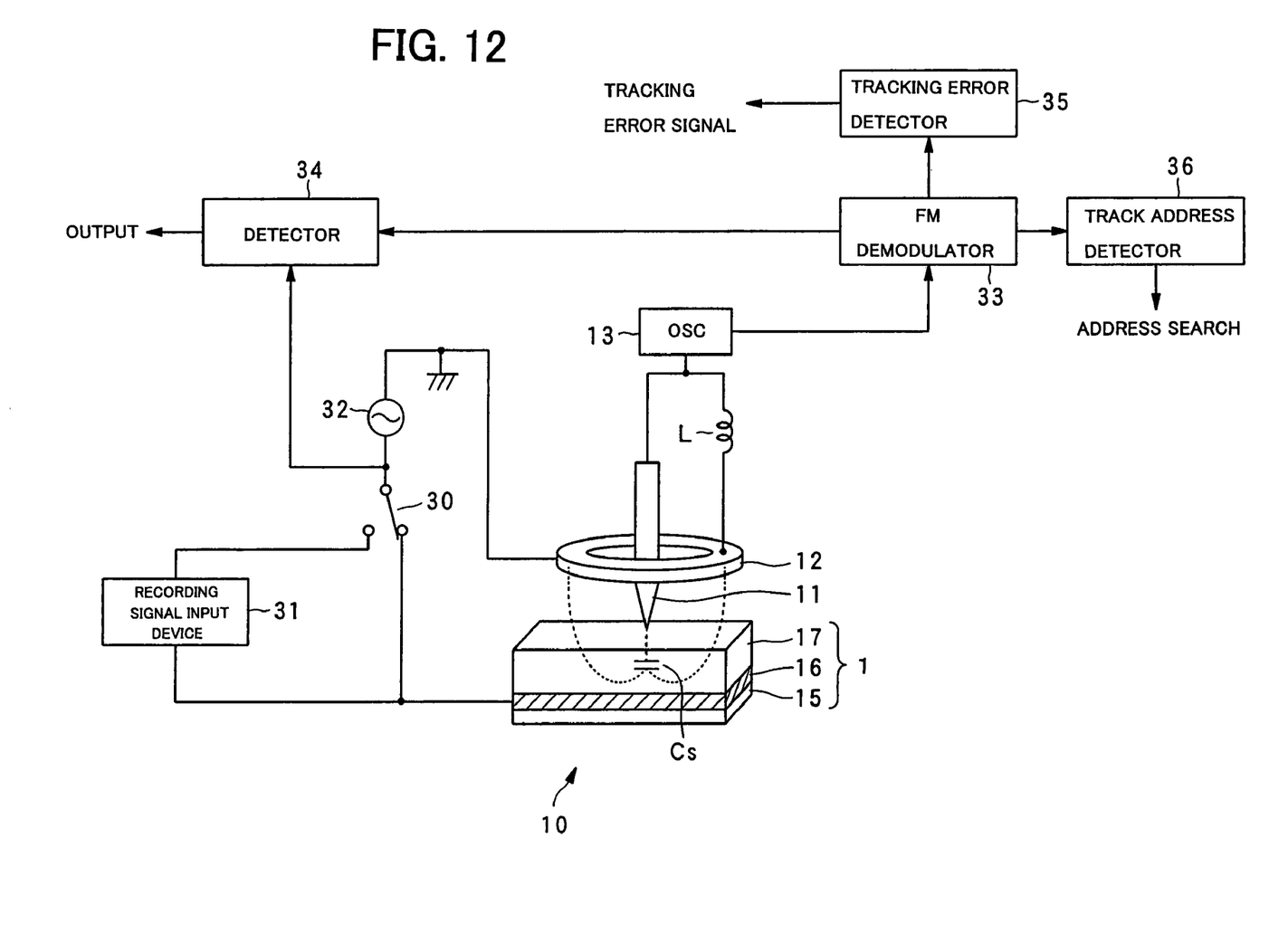
FIG. 12 is a block diagram showing a block structure associated with recording/reproducing signal processing of the dielectric recording/reproducing apparatus associated with the present invention.

The embodiment of a dielectric recording/reproducing apparatus associated with the present invention will be explained with reference to FIG. 11 and FIG. 12. FIG. 11 is a schematic diagram showing a dielectric recording/reproducing apparatus using the ferroelectric recording medium. FIG. 12 is a block diagram showing a block structure associated with its recording/reproducing signal processing. Incidentally, this embodiment shows the apparatus using the disc-shaped ferroelectric recording medium associated with the present invention, but an apparatus using a rectangular ferroelectric recording medium provided with linear recording tracks can be also constructed by using a mechanism in which the probe or the ferroelectric recording medium is moved linearly and relatively.

As shown in FIG. 11, a dielectric recording/reproducing apparatus 10 is provided with: a recording/reproducing head 2; a motor 26 for rotating the ferroelectric recording medium 1; a tracking mechanism 14 for the recording/reproducing head 2; a slider 27 for controlling the position of the recording/reproducing head 2 in the radial direction of the disk; and a circuit device 28 for driving and controlling these mechanisms.

The recording/reproducing head 2 is provided with: a probe 11 for applying an electric field with its tip portion facing to a ferroelectric material of the ferroelectric recording medium 1; a return electrode 12 for returning the electric field applied from the probe 11; an inductor L placed between the probe 11 and the return electrode 12; and an oscillator 13 which oscillates at a resonance frequency determined from the inductor L and a capacitance (e.g. a capacitance Cs in FIG. 3) in a portion formed on the ferroelectric material just under the probe 11 and polarized correspondingly to recorded data. These constitutional elements are formed in one piece in a common base material 18.

The probe 11 is a conductive member, or an insulating member coated with a conductive film. The tip portion facing to the ferroelectric material is hemispherical, having a predetermined radius. This radius is an important factor in determining the radius of the polarization formed in the ferroelectric material correspondingly to record data and determines the recording density, so it is extremely small, on the order of 10 nm. Data is recorded by applying a voltage between the probe 11 and the electrode 16 to form in the ferroelectric material a domain polarized in a predetermined direction, while the recorded data is picked up on the basis of the capacitance corresponding to the polarization.

The return electrode 12 is an electrode for returning the electric field generated by the oscillator 13 and applied to the ferroelectric material from the probe 11, and is placed so as to surround the probe 11. In the SNDM method, the change of the capacitance corresponding to a nonlinear dielectric constant of the ferroelectric material is directly detected. To detect this change of the capacitance, it is preferable that a compact oscillating circuit is formed on or above one surface of the ferroelectric recording medium. In this embodiment, the oscillating circuit (resonance circuit) is provided with the oscillator 13, the inductor L, the probe 11, and the return electrode 12. In this oscillating circuit, the high-frequency signal flows from the probe 11 to the return electrode 12 thorough the ferroelectric material 17, as shown in FIG. 12. This route is a part of the oscillating circuit. It is preferable that this route is short in order to reduce noises due to a floating capacitance C0 and the like. The return electrode 12 is disposed so as to surround the probe 11 and the distance between the probe 11 and the return electrode 12 is very short. Therefore, the route that the high-frequency signal flows can be shortened, so that the noises can be reduced.

The inductor L is placed between the probe 11 and the return electrode 12, and may be formed with a microstripline, for example. The resonance frequency of the resonance circuit containing the oscillator 13, the inductor L, the probe 11 and the return electrode 12 is determined by the inductor L and the capacitance Cs. The inductance of the inductor L is determined so that this resonance frequency, $f=1/2\pi\sqrt{LCs}$, is about 1 GHz, for example. Incidentally, the capacitance factor to determine the resonance frequency f is not only the capacitance Cs but also the floating capacitance C0. However, since the recording/reproducing head of the present invention takes a structure for compact placement in view of the floating capacitance C0, the C0 can be assumed to be practically a constant when reproducing a signal by the SNDM. The resonance frequency f is simply expressed here as a function of the capacitance Cs and the inductor L because what changes the f in the signal reproduction is a capacitance change $\Delta$ Cs of the Cs. In fact, however, the capacitance includes the floating capacitance C0, and has implications of Cs+C0.

The change of the capacitance Cs corresponds to the nonlinear dielectric constant of the ferroelectric material 17 located just under the tip of the probe 11. The nonlinear dielectric constant of the ferroelectric material 17 located just under the tip of the probe 11 is determined according to the polarization direction of the ferroelectric material 17 at this part. In the state that data was recorded in the recording area 102 of the ferroelectric material 17, the polarization directions of the ferroelectric material 17 within the recording area 102 are changed and set according to the data (e.g. a bit sequence of the data). Therefore, the change of the capacitance Cs is changed according to the data recorded in the ferroelectric material 17.

The oscillator 13 is an oscillator which oscillates at a frequency determined from the inductor L and the capacitance Cs. The oscillation frequency varies, depending on the change of the capacitance Cs. Therefore, FM modulation is performed correspondingly to the change of the capacitance Cs determined by the polarization domain corresponding to the recorded data. By demodulating this FM modulation, it is possible to read the recorded data.

The base material 18 is equipped with and holds: the probe 11; the return electrode 12; the inductor L; and the oscillator 13, in one piece. The base material 18 may be case-shaped, containing an electric conductor, so as to have an effect of electromagnetic wave cut-off.

Incidentally, if there is only one probe 11, the head can take the following two forms: one is that record data and an alternating current (AC) signal superimposed thereon are applied to the ferroelectric recording medium side (electrode 16) with the probe 11 earthed; and the other is that record data and an AC signal superimposed thereon are applied to the probe 11 with the ferroelectric recording medium side (electrode 16) earthed.

The probe 11 touches the ferroelectric material 17, or faces to it with a small space. Corresponding to the radius of the tip portion of the probe 11, a polarization domain is formed in the ferroelectric material 17. When a voltage is applied to this probe 11, an electric field returns to the return electrode 12 via the ferroelectric material 17. At this time, the capacitance Cs, which corresponds to the polarization P in the ferroelectric material 17 on or under the tip portion of the probe 11, participates in the resonance circuit made with the inductance L. By this, the oscillation frequency comes to depend on the capacitance Cs. By demodulating an oscillation signal which is FM-modulated on the basis of this capacitance Cs, a detection voltage shown in FIG. 3 is outputted, and the recorded data is reproduced. On the other hand, in data recording, the recording is performed by applying a voltage corresponding to the data between the probe 11 and the electrode 16, and thus setting the polarization direction of the ferroelectric material 17. In data recording, the voltage is set so as to generate an electric field stronger than the coercive electric field of the ferroelectric material.

Incidentally, it is also possible to use a plurality of probes 11. In using a plurality of probes, it is necessary to apply to each probe record data and an AC signal for coherent detection, and it is also necessary to provide a low cut filter in order to prevent the leakage of the signals into the oscillator 13.

The motor 26 rotates the disc-shaped ferroelectric recording medium 1, generating the relative movement between the probe 11 and the ferroelectric recording medium 1. In order to detect the number of revolutions, the motor 26 is provided with a device for generating a frequency corresponding to the number of revolutions. If the recording track of the ferroelectric recording medium 1 is linear, the motor 26 is mounted on a stage capable of moving the ferroelectric recording medium in the X-Y direction.

The tracking mechanism 14 is a mechanism for the probe 11 tracing on the recording track of the ferroelectric recording medium 1. It controls the position of the probe 11 on the basis of the tracking error signal detected from a signal reproduced with the probe 11. The method explained with reference to FIG. 5 and FIG. 10 or the like is used as the tracking for the ferroelectric recording medium 1.

The slider 27 controls the position of the recording/reproducing head 2 in the radial direction of the disk. It moves the recording/reproducing head 2 according to the search of a track address or the direct current component of the tracking error signal.

The circuit device 28 is provided with: a signal input/output circuit; a recording/reproducing signal processing circuit; a control and driving circuit for the mechanism of the dielectric recording/reproducing apparatus 10; a system control circuit including a CPU (Central Processing Unit); a power circuit; and the like.

In recording/reproducing signal processing, as shown in FIG. 12, a recording signal input device 31 and an AC signal generation device 32 are connected, when recording, by a switch 30 for switching an input signal in recording/reproducing, and thus signals are supplied to the electrode 16 of the ferroelectric recording medium 1. On the other hand, only the AC signal generation device 32 is connected when reproducing.

When recording, a recording signal from the recording signal input device 31 is supplied to the electrode 16. By an electric field between the probe 11 and the electrode 16, the polarization of a domain of the ferroelectric material 17 just under the probe 11 is determined. Then, the polarization direction is fixed and becomes record data. Incidentally, the AC signal of the AC signal generation device 32 is superimposed on the recording signal. This is used for monitoring the recorded data which is now recorded while the data recording is performed. The process of monitoring the recorded data is the same as the process of reproducing the recorded data. Concretely, the oscillator 13 oscillates at a resonance frequency determined from the inductor L and the capacitance Cs, and the frequency is modulated by the capacitance Cs. This FM-modulated wave is demodulated at a FM demodulator 33, and this is inputted to a detector 34. Moreover, the AC signal from the AC signal generation device 32 is also inputted to the detector 34. On the basis of the signal, the coherent detection of the signal demodulated at the FM demodulator 33 is performed to reproduce the recorded data. Namely, it is possible to monitor the recording state while recording.

When reproducing, the recording signal input device 31 is disconnected by the switch 30, and only the AC signal is supplied to the electrode 16. The oscillator 13 oscillates at a resonance frequency formed by the inductor L and the capacitance Cs in the domain already polarized correspondingly to data. Therefore, the oscillation signal is FM-modulated by the capacitance Cs, and this signal is demodulated at the FM demodulator 33 and is inputted to the detector 34. Moreover, the AC signal from the AC signal generation device 32 is also inputted to the detector 34. On the basis of the signal, the coherent detection of the signal demodulated at the FM demodulator 33 is performed to reproduce the recorded data.

At the time of the above-described recording and reproducing, a tracking error signal and a track address for controlling the apparatus are detected from the signal demodulated at the FM demodulator 33. The tracking error signal is detected at a tracking error detector 35. The detection processing is performed according to the method explained with reference to FIG. 5 and FIG. 10, for example, or the like, and the detected tracking error signal is inputted to the tracking mechanism 14 and the slider 27 to control these devices. The track address is detected at a track address detector 36. According to the track address, the slider is controlled. Thus, the recording/reproducing head 2 is moved to a target track.

Incidentally, the recording signal and the AC signal can be inputted from the side of the probe 11. In this case, it is preferable to provide a filter in order to prevent the leakage of the signals into the oscillator 13. In this case, the electrode 16 may be earthed. Moreover, if there are a plurality of probes 11, it is preferable to take this form.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-200101 filed on Jul. 9, 2002 including the specification, claims, drawings and summary is incorporated herein by reference in its entirety.

What is claimed is:

1. A dielectric recording medium comprising:
   a substrate;
   an electrode disposed on the substrate; and
   a dielectric material disposed on the electrode, wherein
   the dielectric recording medium is disk-shaped,
   the dielectric material is divided into an inner area, an outer area and a data area,
   the inner area and the outer area have respective predetermined widths,
   the data area is located between the inner area and the outer area, and
   polarization directions of each of the inner area and the outer area are set in the opposite direction to a polarization direction of the data area.

* * * * *